United States Patent
Länge (10) Patent No.: US 8,908,264 B2
(45) Date of Patent: Dec. 9, 2014

(54) REDUCING TRANSIENTS IN AN OPTICAL AMPLIFIER

(75) Inventor: Roman Länge, Tuebingen (DE)

(73) Assignee: JDS Uniphase Corporation, Milpitas, CA (US)

( * ) Notice: Subject to any disclaimer, the term of this patent is extended or adjusted under 35 U.S.C. 154(b) by 600 days.

(21) Appl. No.: 13/220,369

(22) Filed: Aug. 29, 2011

(65) Prior Publication Data

US 2012/0050845 A1    Mar. 1, 2012

Related U.S. Application Data

(60) Provisional application No. 61/378,721, filed on Aug. 31, 2010.

(51) Int. Cl.
*H04B 10/296*    (2013.01)

(52) U.S. Cl.
CPC ..................... *H04B 10/296* (2013.01)
USPC ..................................................... 359/341.43

(58) Field of Classification Search
CPC ...................................................... H04B 10/296
USPC ..................................................... 359/341.43
See application file for complete search history.

(56) References Cited

U.S. PATENT DOCUMENTS

| | | | |
|---|---|---|---|
| 5,812,710 A * | 9/1998 | Sugaya | 385/27 |
| 5,870,217 A * | 2/1999 | Itou et al. | 398/97 |
| 6,246,514 B1 | 6/2001 | Bonnedal et al. | 359/341.41 |
| 6,288,836 B1 * | 9/2001 | Kawasaki et al. | 359/341.42 |
| 6,411,429 B1 * | 6/2002 | Tomofuji et al. | 359/337 |
| 6,522,460 B2 | 2/2003 | Bonnedal et al. | 359/341.42 |
| 6,535,330 B1 * | 3/2003 | Lelic et al. | 359/337.13 |
| 6,668,137 B1 | 12/2003 | Cordina | 398/94 |
| 6,690,505 B1 * | 2/2004 | Ye | 359/337 |
| 6,690,508 B2 * | 2/2004 | Tian et al. | 359/341.4 |
| 6,738,184 B2 * | 5/2004 | Hayashi et al. | 359/341.4 |
| 6,847,478 B1 * | 1/2005 | Tanaka et al. | 359/334 |
| 6,977,770 B2 * | 12/2005 | Komaki et al. | 359/337.11 |
| 7,209,284 B2 * | 4/2007 | Shukunami et al. | 359/341.41 |
| 7,483,205 B1 * | 1/2009 | Lundquist et al. | 359/341.3 |
| 7,961,380 B2 * | 6/2011 | Shia et al. | 359/341.42 |
| 8,134,776 B1 * | 3/2012 | Chen | 359/341.41 |
| 8,259,390 B2 * | 9/2012 | Hoshi et al. | 359/344 |
| 2002/0176156 A1 * | 11/2002 | Zahnley et al. | 359/341.4 |
| 2005/0270635 A1 * | 12/2005 | Shukunami et al. | 359/337 |
| 2009/0207484 A1 * | 8/2009 | Shia et al. | 359/341.3 |

OTHER PUBLICATIONS

Chan et al., "Minimizing gain transient dynamics by optimizing the erbium concentration and cavity length of a gain clamped EDFA", Optics Express 7520, vol. 13, No. 19, Sep. 19, 2005.

(Continued)

*Primary Examiner* — Ari M Diacou
(74) *Attorney, Agent, or Firm* — JDS Uniphase Corporation (57) ABSTRACT

A controller for reducing a transient variation of gain of an optical amplifier is disclosed. The controller includes a control circuit adapted to generate an electrical signal mimicking optical gain transient variation upon an abrupt change in input loading conditions. The electrical signal is applied to a variable optical attenuator disposed downstream of the active optical fiber of the optical amplifier. The control circuit can be realized in a variety of ways, but preferably it includes a logarithmic amplifier and a high-pass filter sequentially connected. The logarithmic amplifier is connected to an input tap/photodetector, and the high-pass filter is connected to the variable optical attenuator.

10 Claims, 5 Drawing Sheets

(56) References Cited

OTHER PUBLICATIONS

Sun et al., "Analytical formula for the transient response of erbium-doped fiber amplifiers", Applied Optics vol. 38, No. 9, Mar. 20, 1999.

Srivastava et al., "EDFA Transient Response to Channel Loss in WDM Transmission System", IEEE PHot Tech Lett vol. 9, No. 3, Mar. 1997.

* cited by examiner

REDUCING TRANSIENTS IN AN OPTICAL AMPLIFIER

CROSS-REFERENCE TO RELATED APPLICATIONS

The present invention claims priority from U.S. Provisional application No. 61/378,721, filed Aug. 31, 2010 which is incorporated herein by reference.

TECHNICAL FIELD

The present invention relates to optical amplifiers, and in particular to reducing or compensating transient variations of gain in optical amplifiers.

BACKGROUND OF THE INVENTION

In a wavelength division multiplexing (WDM) optical transmission system, optical signals at a plurality of wavelengths are encoded with digital streams of information. These encoded optical signals, or optical channels, are combined together and transmitted through a series of spans of an optical fiber comprising a transmission link of a WDM fiberoptic network. At a receiver end of the transmission link, the optical channels are separated, whereby each optical channel can be detected by an optical receiver.

While propagating through an optical fiber, light loses power. This power loss is well understood and is related to the physics of propagation of light in the fiber. Yet some minimal level of optical channel power is required at the receiver end to decode information that has been encoded in an optical channel at the transmitter end. To boost optical signals propagating in an optical fiber, optical amplifiers are deployed at multiple locations, known as nodes, along the transmission link. The optical amplifiers extend the maximum possible length of the link, in some instances, from a few hundred kilometers to several thousand kilometers, by amplifying optical signals to power levels close to the original levels of optical power at the transmitter end.

An erbium-doped fiber amplifier (EDFA) is one of the most practical types of optical amplifiers employed in fiberoptic networks. A single EDFA module can amplify about a hundred optical channels at a time, thus providing significant cost savings. One of the main components of an EDFA is a length of an active optical fiber having a core doped with ions of a rare earth element erbium. The erbium doped fiber (EDF) is optically pumped by using a suitable pump, such as a diode laser, so as to create a population inversion between energy states of the erbium ions comprising a gain medium of the EDF. Once the population inversion is created, the gain medium begins to amplify an optical signal propagating along the core of the EDF. The gain medium is characterized by a wavelength-dependent gain coefficient. During the amplification process, the optical power of the pump is absorbed by the gain medium, which simultaneously amplifies all the optical channels present in the optical signal. The amplification coefficient of a particular channel depends on the input optical power and on the optical power of the pump. When the number of optical channels changes suddenly, for example, due to adding, dropping, or routing of some of the optical channels, the input optical power changes stepwise, which results in a change of the gain coefficient of the gain medium of the EDF. The gain coefficient change impacts output optical power of the rest of the optical channels.

Most optical amplifiers of the prior art have a gain stabilization circuit that reacts to changes of input optical power by changing the pump optical power. For example, in U.S. Pat. No. 6,989,923 by Stentz, an apparatus for automatically controlling gain of an optical amplifier is disclosed. The apparatus of Stentz generates a first control signal from a feed-forward control circuit and a second control signal from a feedback control circuit. The optical power of the pump is adjusted in accordance with both control signals. Similarly, in U.S. Pat. Nos. 6,246,514 and 6,522,460 by Bonnedal et al., the feed-forward and feedback controls are combined, and in addition, pilot tones are used to measure the amplifier gain. In one embodiment, an EDFA controller of Bonnedal et al. calculates the number of channels present in the input optical signal and adjusts the optical power of the pump accordingly.

Disadvantageously, the accuracy of transient control, that is, the degree to which transient fluctuations of optical channel power may be suppressed, is limited by the temporal dependence of the EDF optical gain. Even when the optical power of the pump increases instantaneously, the EDF optical gain does not. There is a certain delay of the EDF gain growth following the pump increase, which is related to the rate of populating an excited meta-stable energy level $^4I_{11/2}$ of erbium ions. Similarly, when the power of the pump decreases, or when the input optical power increases, the gain does not decrease instantaneously. The gain in fact decreases at a rate of change of the population inversion in the EDF gain medium. As a result, a transient change of the gain coefficient and, consequently, a transient change of output optical power is produced.

These transient fluctuations of optical power of a signal can grow in magnitude as the signal propagates along a transmission link containing many EDFAs, which can ultimately lead to a loss of information and even to a loss of network stability and/or to damage of optical receivers. To avoid stability loss or damage to network components, it is imperative that transient changes of optical power of propagating signals be kept below a certain acceptable level.

A method for adaptively controlling an optical gain in an EDFA has been described in U.S. Pat. No. 6,894,832 by Aweya et al. In the method of Aweya et al., the temporal behavior of the optical gain in the EDF is approximated by using a so-called reference model. The reference model of Aweya et al. is a dynamic model used for computing a reference value of the output optical power corresponding to the input optical power and target optical gain of the EDFA. The reference value is compared to a measured value of the EDFA output optical power, and the optical power of the pump is adjusted so as to bring the measured value of the EDFA output optical power to the computed reference value. An adaptation mechanism is described for adjusting a ratio between the signal from the reference model, the feedback signal, and the feed-forward signal, wherein all three signals are used to adjust the optical power of the EDFA pump.

Disadvantageously, the method of Aweya et al. is computation intensive, which can lengthen the response time of a corresponding control apparatus. Transient variations of the output optical channel power can occur in a sub-microsecond time domain. Given the amount of the computations required to implement the method of Aweya et al. for controlling the optical gain of an EDFA, the sub-microsecond response time may be difficult to achieve in combination with the required degree of transient suppression.

An apparatus and a method for controlling gain in an optical amplifier by accounting for transient changes of energy levels population in the EDF gain medium has been described by Lelic in U.S. Pat. No. 6,900,934. The method of Lelic involves real-time tracking of the population of an excited energy state of erbium by measuring a residual pump power, that is, by measuring the optical power of the pump light which has not been absorbed in the EDF. Disadvantageously, the apparatus of Lelic comprises a complicated digital processor, as well as an optical tap, an optical filter, and a photodetector dedicated to measuring the residual pump optical power.

Figure 1:
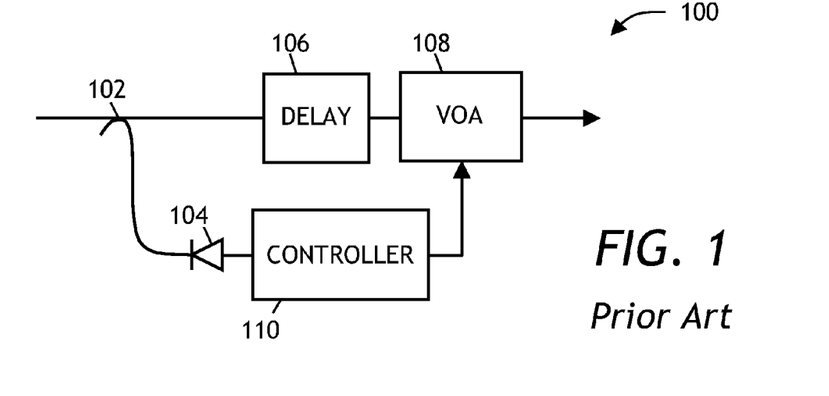
FIG. 1 is a block diagram of a prior-art transient control apparatus.

Another known approach to reducing transient variations of gain of an optical amplifier consists in stabilizing overall power of the input optical signal before it reaches the optical amplifier. For example, Cordina in U.S. Pat. No. 6,668,137 discloses a power control apparatus for stabilizing overall optical power of a signal propagating in an optical fiber. Referring to FIG. 1, a power control apparatus 100 of Cordina includes an optical tap 102, a photodiode 104, an optical delay element 106, a variable optical attenuator (VOA) 108, and a controller 110. In operation, the controller 110 receives a signal from the photodetector 104 and adjusts the VOA 108 to keep the output optical power constant. The delay element 106 is required to compensate for a finite response time of the VOA 108 and the controller 110. The Cordina apparatus 100 enables power transients to be detected in time for a "pre-emptive" control, to suppress transients which are too fast to be suppressed by the above described conventional control of optical amplifiers.

Lundquist et al. in U.S. Pat. No. 7,483,205 discloses a similar apparatus. The apparatus of Lundquist et al. includes a variable optical attenuator, an optical power sensor disposed upstream of the variable optical attenuator, and a control loop configured to stabilize optical power after the variable optical attenuator. The control electronics and the variable optical attenuator of the Lundquist apparatus must be very fast to be able to react to sub-microsecond input optical power changes, which increases the cost of the Lundquist apparatus.

Furthermore, a common drawback of optical power stabilizers of Cordina and Lundquist et al. is that optical power stabilizers of Cordina and Lundquist et al. achieve power stabilization by attenuating the optical signal before the amplifier, thus lowering achievable optical signal-to-noise ratio. The signal-to-noise ratio is lowered because the amplified spontaneous emission (ASE) noise of the optical amplifier is not attenuated by the variable optical attenuator, while the incoming optical signal is.

In view of the foregoing, there is a need to provide an apparatus and a method for reducing optical transients, that would overcome the above described prior-art shortcomings of slow response time, complexity of the control circuitry, and varying per-channel optical power. The present invention allows one to considerably reduce transient variations of output power of optical amplifiers by using a simple control circuit, which can be easily added to existing optical amplifiers of different designs.

SUMMARY OF THE INVENTION

The present invention overcomes the drawbacks of the prior art by providing a circuit that simulates a response of an active optical fiber to a rapid change of input loading conditions. The circuit is connected to an optical tap/photodetector disposed upstream of the optical fiber, and to a variable optical attenuator disposed downstream of the active optical fiber. The circuit provides a control signal for the variable optical attenuator. The control signal mimics the expected optical amplifier gain variation. As a result, the transient variation of gain of the optical amplifier is suppressed, or at least significantly reduced, by the variable optical attenuator.

A control circuit of the invention can be added to existing optical amplifiers already having some form of feed-forward and/or feedback control, for improving achievable suppression of optical transients. Advantageously, the input optical tap and photodetector used for feed-forward control or optical power management can be shared with the control circuit of the invention. The variable optical attenuator can also be shared when present in an optical amplifier. For example, multistage optical amplifiers often have a mid-stage variable optical attenuator that can be shared with a control circuit of the invention.

Preferably, the control circuit includes a logarithmic amplifier connected to a high-pass electrical filter. By adding serially coupled logarithmic amplifier and high-pass filter to an existing optical amplifier already having an input optical tap, a photodetector, and a variable optical attenuator, the transient performance of the optical amplifier can be improved at little cost. When the input optical tap, the photodetector, or the variable optical attenuator are absent in the existing optical amplifier, the required components can be provided as a part of the controller apparatus.

In accordance with the invention there is provided a controller for reducing a transient variation of gain of an optical amplifier including an optical tap having an input port and first and second output ports, for receiving an input optical signal at the input port, splitting the input optical signal into first and second optical signals, and directing the first and the second optical signals to the first and the second output ports, respectively, a photodetector coupled to the first output port, for detecting the first optical signal, a length of an active optical fiber coupled to the second output port, for amplifying the second optical signal when the active optical fiber is pumped by an optical pump source, and a variable optical attenuator coupled to the active optical fiber downstream thereof, for attenuating the amplified second optical signal in dependence upon a control signal applied to the variable optical attenuator, so as to produce the output optical signal, wherein the controller is coupled to the photodetector and to the variable optical attenuator, wherein the controller comprises a control circuit adapted to generate, based on the detected first optical signal, the control signal for the variable optical attenuator, having a magnitude and a temporal profile corresponding to a magnitude and a temporal profile of a transient change of optical gain of the active optical fiber caused by a transient change of optical power of the second optical signal, thereby reducing the transient variation of gain of the optical amplifier.

In accordance with another aspect of the invention there is further provided a method for reducing a transient variation of gain of an optical amplifier, comprising (a) splitting an input optical signal into first and second optical signals and detecting the first optical signal using a photodetector;

(b) amplifying the second optical signal in a length of an active optical fiber pumped by an optical pump source;

(c) generating, based on the detected first optical signal, a control signal for a variable optical attenuator, the control signal having a magnitude and a temporal profile corresponding to a magnitude and a temporal profile of a transient change of optical gain of the active optical fiber caused by a transient change of optical power of the second optical signal; and (d) applying the control signal to a variable optical attenuator disposed downstream of the active optical fiber, so as to compensate for the transient variation of gain of the optical amplifier.

BRIEF DESCRIPTION OF THE DRAWINGS

Exemplary embodiments will now be described in conjunction with the drawings in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 2:
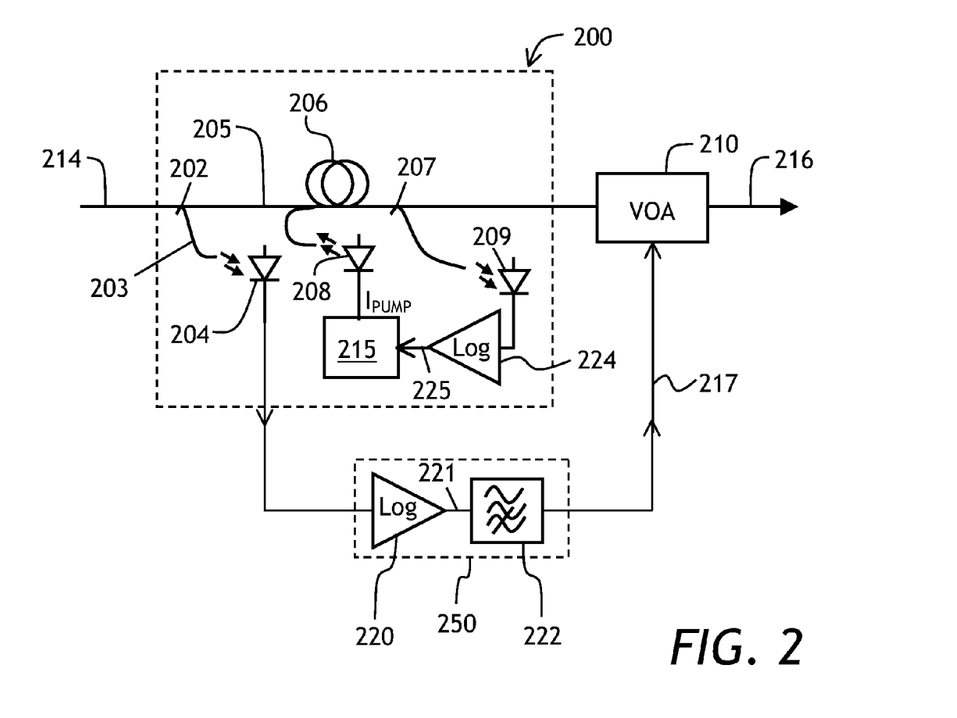
FIG. 2 is a block diagram of an optical amplifier of the invention, including a control circuit for reducing a transient variation of optical gain.

Referring to FIG. 2, an optical amplifier 200 includes first and second optical taps 202 and 207, respectively, coupled to first and second photodetectors 204 and 209, respectively, a length of active optical fiber 206 pumped by a pump laser diode 208, a logarithmic preamplifier 224, and a feedback controller 215. The active optical fiber 206 is preferably an erbium-doped optical fiber (EDF). Other active optical fibers, including other rare earth doped active fibers, can be used. In operation, the first optical tap 202 splits off a small fraction 203, e.g. 1% to 10%, of an input optical signal 214 for detection at the first photodetector 204. A major fraction 205 of the input optical signal 214 is amplified by the active optical fiber 206. A small fraction of the amplified light is split off by the second optical tap 207 for detection at the second photodetector 209. The logarithmic preamplifier 224 amplifies the photocurrent generated by the second photodetector 209. The pump laser diode 208 is powered by a pump current $I_{PUMP}$, which is supplied by the feedback controller 215 in dependence upon an output signal 225 of the preamplifier 224, so as to stabilize the optical power at the output of the active fiber 206. The feedback control methods of optical amplifiers are well known in the art. The feedback methods can include, for example, a proportional integral-differential (PID) control method. While the feedback controller 215 stabilizes the average output optical power, fast optical transients are nonetheless generated upon a stepwise increase or decrease of the input optical power. The generation of the optical transients is related to dynamics of population inversion in the active optical fiber 206.

In accordance with the invention, a control circuit 250 and a variable optical attenuator 210 are provided for suppressing the optical transients. The function of the control circuit 250 is to generate, based on the tapped signal 203 detected by the photodetector 204, a control signal 217 to control the attenuation level of the variable optical attenuator 210, to dynamically attenuate light amplified by the active optical fiber 206, so as to counterbalance and suppress the optical transients. To achieve transients suppression, the control signal 217 is generated to have a magnitude and a temporal profile corresponding to a magnitude and a temporal profile of a transient change of gain of the optical amplifier 200, caused by a transient change of optical power of the main part 205 of the optical signal 214 applied to the active optical fiber 206.

Preferably, the control circuit 250 includes a logarithmic amplifier 220 and a high-pass filter 222, serially coupled as shown in FIG. 2. It has been discovered that the serially connected logarithmic amplifier 220 and the high-pass filter 22 provide the control signal 217 closely resembling the transient change of gain of the optical amplifier 200. Conveniently, the logarithmic amplifier 220 also serves as a preamplifier for the first photodiode 204 at the same time. The controller 212 can also be constructed to include a microprocessor programmed to generate the control signal 217, although the latter solution is more costly.

Adjusting the variable optical attenuator 210 disposed downstream from the active optical fiber 206 results in a more quick and efficient transient suppression, than adjusting the pump current $I_{PUMP}$ as is commonly done in the prior art. Accordingly, very fast transients, in sub-microsecond time domain, can be suppressed, provided that the logarithmic amplifier 220 and the variable optical attenuator 210 have a fast (for example, sub-microsecond) response time.

Figure 3:
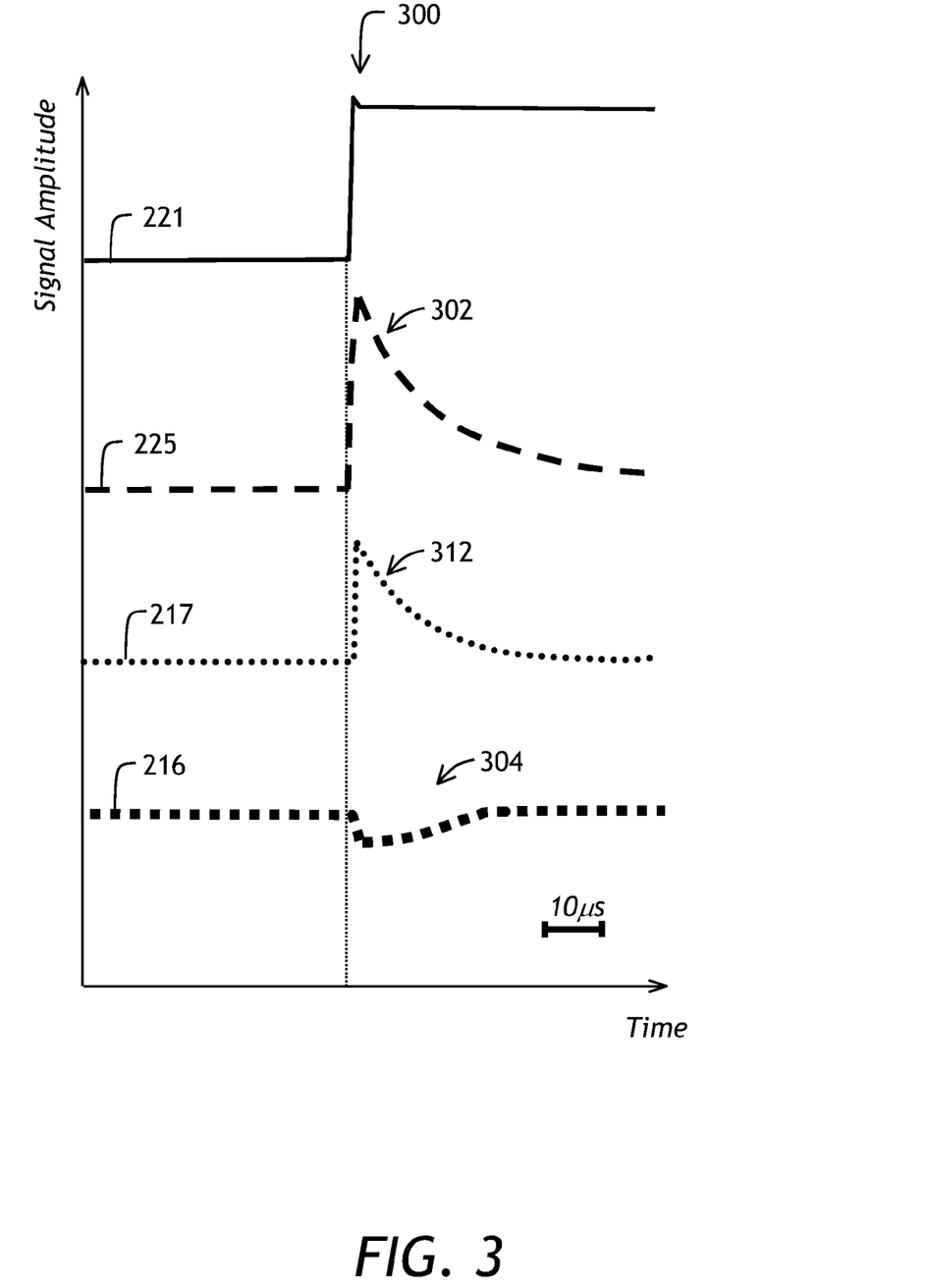
FIG. 3 are time traces of various electrical signals and the output optical signal in the optical amplifier of FIG. 2.

Referring to FIG. 3, a stepwise increase of optical power of the input optical signal 214 due to adding a new optical channel to the signal 214 is detected by the first photodetector 204, causing a stepwise increase 300 of an output signal 221 of the logarithmic amplifier 220. At the same time, the stepwise increase of input optical power causes a variation of the optical power of the amplified optical signal, which is detected by the second photodetector 209. This causes the controller 215 to adjust the pump current $I_{PUMP}$, so as to reduce the output power back to the original level; as a result, the output signal 225 of the logarithmic preamplifier 224 will show a transient variation 302.

The first electrical signal 221 is filtered by the high-pass filter 222, producing a pulse 312 in the control signal 217. A logarithm of the linear attenuation value of the variable optical attenuator 210 is preferably proportional to the magnitude of the control signal 217. In other words, the attenuation in dB units provided by the variable optical attenuator 210 is preferably proportional to the magnitude of the control signal 217. Because the magnitude and the temporal profile of the control signal 217 corresponds to the magnitude and the temporal profile of the transient variation 302 of the optical power of the signal amplified by the active optical fiber 206, the transient 302 of the amplified signal is compensated for, or suppressed. An output transient 304 of the output optical signal 216 is considerably reduced in magnitude.

The control circuit 250 can be added to existing optical amplifiers to suppress optical transients. If an existing optical amplifier does not have the input tap 202 or the variable optical attenuator 210, these can be provided as a part of the controller apparatus for reducing optical transients. Erbium doped optical amplifiers (EDFAs) used in optical communications frequently include input/output taps and/or variable optical attenuators for traditional feedback/feed-forward control. Using the control circuit 250 in addition to the traditional feed-forward/feedback control circuits allows one to significantly reduce optical transients at a moderate cost.

Figure 4:
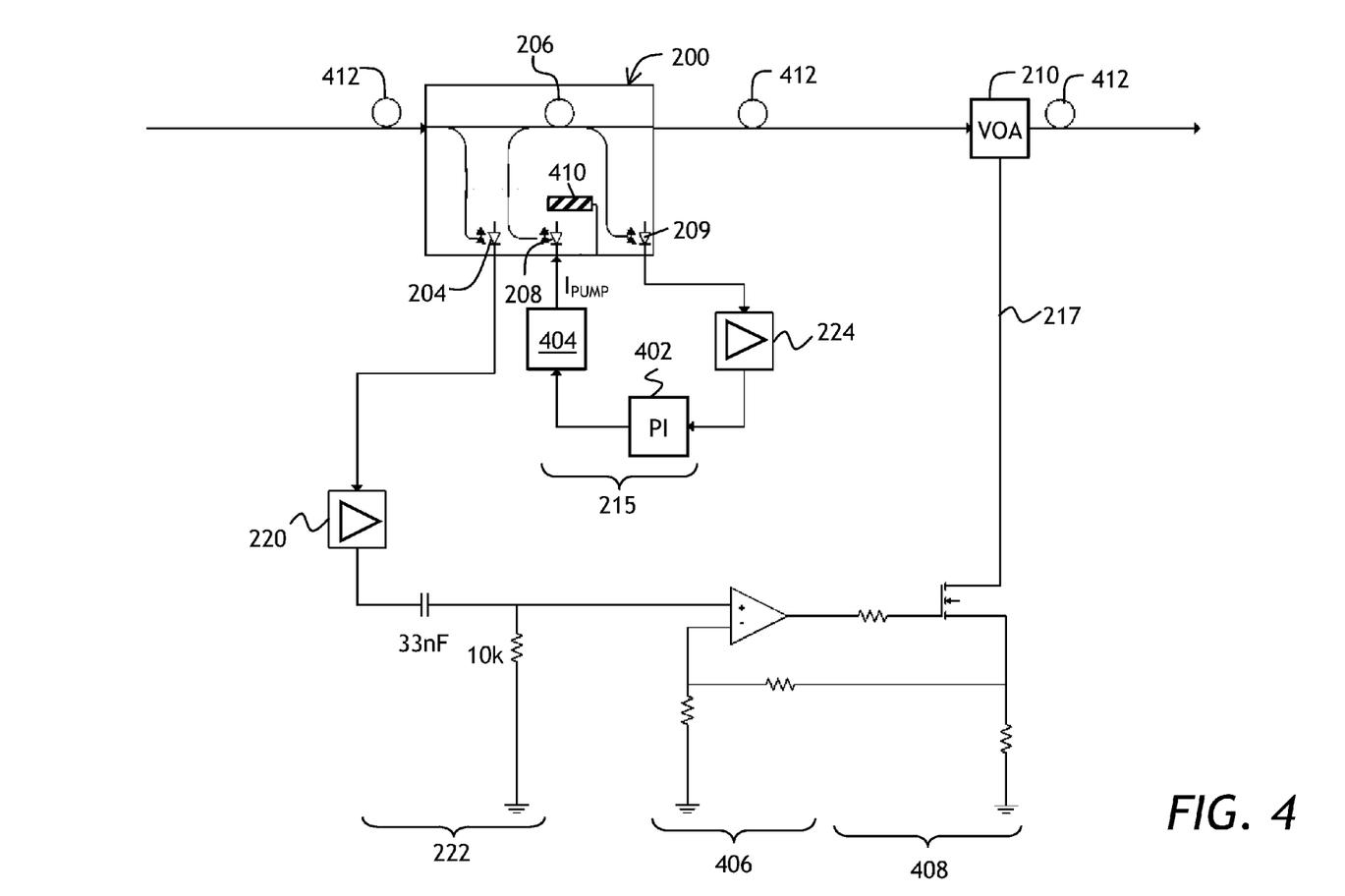
FIG. 4 is a block diagram of the optical amplifier of FIG. 2, including an electrical schematic of the control circuitry.

Turning to FIG. 4, an exemplary implementation of the optical amplifier 200 and the control circuit 250 is shown. The feedback controller 215 of FIG. 2 is represented by a proportional integral (PI) controller 402 connected to a pump current source 404. The high-pass filter 222 includes a 33 nF condenser and a 10 k resistor. A repeater 406 and a current source 408 generate the control signal 217 for the variable optical attenuator 210. A TEC 410 is used to stabilize the temperature of the pump diode 208. The logarithmic amplifiers 220 and 224 can be based on MAX4206 and AD8304 logarithmic amplifiers. Circles 412 denote spans of optical fiber.

Figure 5:
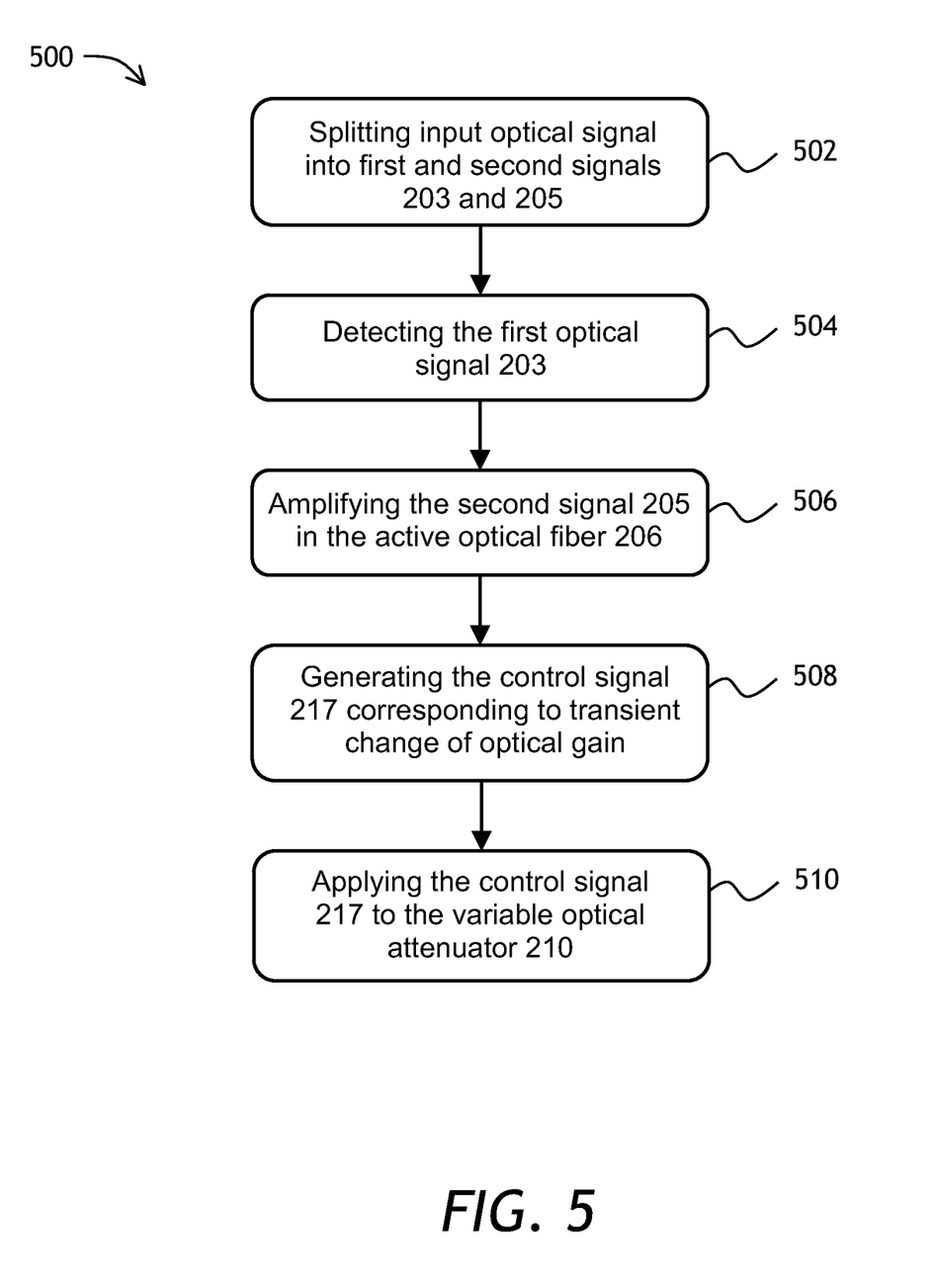
FIG. 5 is a block diagram of a method for reducing a transient variation of gain of the optical amplifier of FIGS. 2 and 3.

Referring now to FIG. 5 with a further reference to FIG. 2, a method 500 for reducing a transient variation of gain of the optical amplifier 200 includes:

a step 502 of splitting the input optical signal 214 into first and second optical signals 203 and 205, respectively;

a step 504 of detecting the tapped (first) portion 203 of the optical signal 214 using the photodetector 204;

a step 506 of amplifying the remaining (second) portion 205 of the optical signal 214 in the active optical fiber 206 pumped by the pump laser diode 208;

a step 508 of generating, based on the detected tapped portion 203, the control signal 217 for the variable optical attenuator 210, the control signal 217 having the magnitude and the temporal profile 312 corresponding to the magnitude and the temporal profile 302 of a transient change of optical gain of the active optical fiber 206 caused by the transient change 300 of optical power of the second portion 205 of the input optical signal 214; and a step 510 of applying the control signal 217 to the variable optical attenuator 210, so as to compensate for the transient variation of gain of the active optical fiber 206.

In one embodiment, the step 508 of generating the control signal 217 includes a step of generating the electrical signal 221 proportional to a logarithm of optical power of the tapped optical signal 203, followed by a step of high pass filtering the electrical signal 221 to obtain the control signal 217.

Figure 6A:
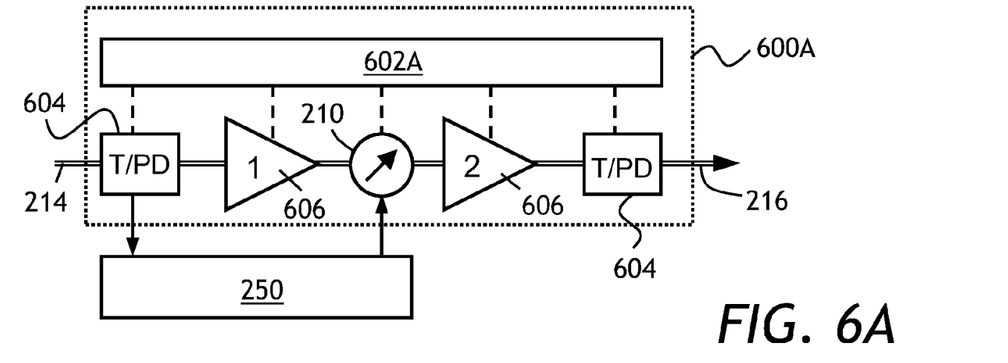
FIGS. 6A and 6B are block diagrams of optical amplifier configurations usable with a transient control apparatus of the invention.
Figure 6B:
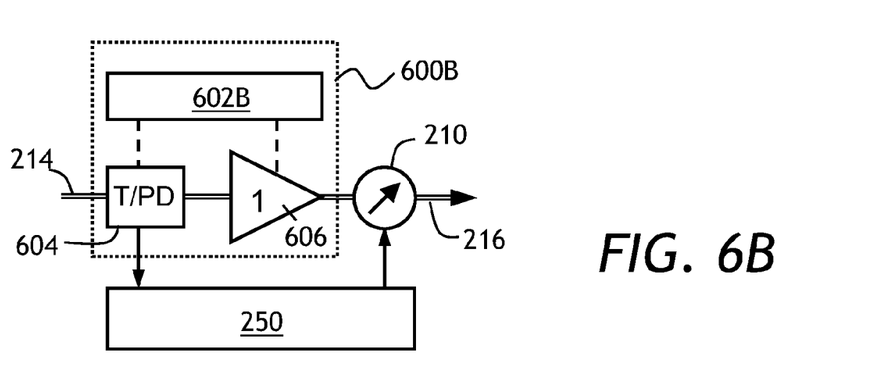

Referring now to FIGS. 6A and 6B, the control circuit 250 of the invention is usable with a variety of existing optical amplifier types. Turning to FIG. 6A, a two-stage optical amplifier 600A is shown. The two-stage optical amplifier 600A includes input and output taps/photodetectors (T/PD) 604, first and second stage optical amplifiers 606, the variable optical attenuator 210 disposed in between the first and the second stage optical amplifiers 606, and a controller 602A for pumping the active optical fibers of the first and the second stage optical amplifiers 606 and providing feed-forward and/or feedback control according to methods of the prior art. To improve the transient suppression, the control circuit 250 of the invention is connected to the input tap/photodetector 604 and the variable optical attenuator 210. Preferably, the control circuit 250 includes the logarithmic amplifier 220 and the high-pass filter 222, shown in FIG. 2.

Turning now to FIG. 6B, a single-stage optical amplifier 600B is shown having one input tap/photodetector 604 and a controller 602B for feed-forward control and pumping the active optical fiber of the single-stage optical amplifier 606. To improve the transient suppression, the control circuit 250 of the invention and the variable optical attenuator 210, disposed downstream form the stage optical amplifier 606, are added to the single-stage optical amplifier 600B. The control circuit 250 is connected to the input tap/photodetector 604 and the variable optical attenuator 210.

For any of the optical amplifiers 200, 600A, or 600B of FIGS. 2, 6A, and 6B, the amplification coefficients of the logarithmic amplifier 220 and the RC constant of the high-pass filter 222 should be selected in dependence upon simulated dynamics of transient response. Such simulations are well known to a person skilled in the art. The simulations must include not only the dynamics of the gain transients in the stage optical amplifiers 606, but also the reaction of the existing feed-forward and/or feedback controls of the optical amplifiers 600A and 600B, as the case may be. The reaction time of the variable optical attenuator 210 preferably must be much smaller than the transient response time, or at least, the reaction time of the variable optical attenuator 210 has to be included in the simulations. For each of the optical amplifiers 200, 600A, and 600B, the inclusion of the control circuit 250 of the invention will provide an improvement of transient performance.

For best results, a controller of the invention may be added to each optical amplifier in an optical communication link. Alternatively, a controller of the invention may be provided only for the final amplifier in the link, to protect photodetectors of the receivers from damage.

What is claimed is:

1. A controller for reducing a transient variation of gain of an optical amplifier, which includes an optical tap having an input port and first and second output ports, for receiving an input optical signal at the input port, splitting the input optical signal into first and second optical signals, and directing the first and the second optical signals to the first and the second output ports, respectively;

a photodetector coupled to the first output port, for detecting the first optical signal;

a length of an active optical fiber between first and second ends thereof, wherein the first end is coupled to the second output port, for amplifying the second optical signal when the active optical fiber is pumped by an optical pump source; and a variable optical attenuator coupled to the second end of the active optical fiber, for attenuating the amplified second optical signal in dependence upon a control signal applied to the variable optical attenuator, so as to produce an output optical signal, wherein the controller is capable of being coupled to the photodetector and to the variable optical attenuator, wherein the controller comprises a control circuit adapted to generate, based on the detected first optical signal, the control signal for the variable optical attenuator, having a magnitude and a temporal profile corresponding to a magnitude and a temporal profile of a transient change of optical gain of the active optical fiber caused by a transient change of optical power of the second optical signal, thereby reducing the transient variation of gain of the optical amplifier.

2. The controller of claim 1, wherein the control circuit comprises a logarithmic amplifier and a high-pass filter, wherein a logarithm of attenuation of the variable optical attenuator is proportional to the control signal.

3. The controller of claim 2, wherein the logarithmic amplifier is coupled to the photodetector, and the high pass filter is coupled to the variable optical attenuator.

4. An optical amplifier comprising an optical tap having an input port and first and second output ports, for receiving an input optical signal at the input port, splitting the input optical signal into first and second optical signals, and directing the first and the second optical signals to the first and the second output ports, respectively;

a photodetector coupled to the first output port, for detecting the first optical signal;

a length of an active optical fiber between first and second ends thereof, wherein the first end is coupled to the second output port, for amplifying the second optical signal when the active optical fiber is pumped by an optical pump source;

a variable optical attenuator coupled to the second end of the active optical fiber, for attenuating the amplified second optical signal in dependence upon a control signal applied to the variable optical attenuator, so as to produce an output optical signal; and a control circuit coupled to the photodetector and to the variable optical attenuator and adapted to generate, based on the detected first optical signal, the control signal for the variable optical attenuator, having a magnitude and a temporal profile corresponding to a magnitude and a temporal profile of a transient change of optical gain of the active optical fiber caused by a transient change of optical power of the second optical signal, thereby compensating the transient variation of gain of the optical amplifier.

5. The amp of claim 4, wherein the control circuit comprises sequentially coupled a logarithmic amplifier and a high-pass filter, wherein a logarithm of attenuation of the variable optical attenuator is proportional to the control signal.

6. The amp of claim 5, wherein the logarithmic amplifier is coupled to the photodetector, and the high pass filter is coupled to the variable optical attenuator.

7. A method for reducing a transient variation of gain of an optical amplifier, comprising
 (a) splitting an input optical signal into first and second optical signals and detecting the first optical signal using a photodetector;
 (b) upon completion of step (a), amplifying the second optical signal in a length of an active optical fiber pumped by an optical pump source;
 (c) generating, based on the detected first optical signal, a control signal for a variable optical attenuator disposed downstream of the active optical fiber and coupled thereto, the control signal having a magnitude and a temporal profile corresponding to a magnitude and a temporal profile of a transient change of optical gain of the active optical fiber caused by a transient change of optical power of the second optical signal; and
 (d) applying the control signal to the variable optical attenuator, so as to compensate for the transient variation of gain of the optical amplifier.

8. The method of claim 7, wherein step (c) comprises
 (e) generating a first electrical signal proportional to a logarithm of the optical power of the first optical signal; and
 (f) high pass filtering the first electrical signal, so as to obtaining the control signal for the variable optical attenuator.

9. The method of claim 8, wherein a logarithm of attenuation of the variable optical attenuator is proportional to the control signal.

10. An optical communication link comprising the optical amplifier of claim 4.

* * * * *